3,393,087
PLASTIC VESSEL COATED WITH EPOXY RESIN CONTAINING LACQUER
Ernst Kamp and Karl Jahn, Nuremberg, Germany, assignors to Monsanto Company, St. Louis, Mo., a corporation of Delaware
No Drawing. Filed Apr. 17, 1956, Ser. No. 578,846
Claims priority, application Germany, Apr. 22, 1955, K 25,605; May 13, 1955, K 25,812; Dec. 14, 1955, K 27,597
10 Claims. (Cl. 117—26)

The invention relates to vessels and in particular to bottles which serve for accommodating substances containing volatile, diffusable materials. Such vessels consist of a finished parent body pre-eminently composed of pliable synthetic material, preferably polyethylene or some similar substance having a wax-like feel which prevents sufficient adhesion of lacquers, and of a layer or coat of lacquer internally and/or externally covering the parent body and adhering thereto. A lacquer is preferably used which is produced on the basis of nitrocellulose with the addition of a polymerization product of esters of α-β-unsaturated carboxylic acids and provided with an addition of an alkyd resin, to which lacquer a softener and a natural resin may be added.

As is well known in the art, alkyd resins, as defined in the Condensed Chemical Dictionary, fourth edition (Reinhold Publishing Corporation, New York), 1950, are made by the union of dibasic acids or anhydrides, usually phthalic anhydride, with a polybasic alcohol such as glycol or glycerine.

The object of the invention is to obtain such vessels in pliant state and in particular with such close structure that they are impervious to aromas, fatty oils, acids, alkalis or substances which contain these components.

According to one aspect of the invention, a lacquer is used which is produced on a nitrocellulose basis and to which not only an addition of a polymerization produce of esters α-β-unsaturated carboxylic acids but also an addition of an alkyd resin is made.

If films are required which are no longer soluble in their solvents or in alcohol and are to a great extent entirely resistant against the action of chemicals, it is advisable to add to the lacquer a substance which enters into reaction, whereby, for example, isocyanates react with compounds having a reactive hydrogen atom or NCO groups, whereas the particular advantages of using polyamides with reactive amine groups are obtained in the case of lacquers with epoxy resins containing free acid groups, by adding a urea resin thereto.

As is well known in the art, an epoxy resin is the condensation product of bisphenol A or glycerine with epichlorohydrin (are ömpp, Chemie Lexicon, 3rd edition (Franckh'sche Verlagschandlung, Stuttgart, Germany), 1952. As pointed out by Rouse, "Curing Agents for Epoxy Resins," Official Digest, Federation of Paint and Varnish Production Clubs, No. 346, November 1953, page 825, "Epoxy resins . . . are condensation polymers of bisphenol A and epichlorohydrin. Bisphenol A, in turn, is a condensation product of phenol and acetone, and its further reaction with epichlorohydrin provides a polyether chain to which hydroxyl groups are attached at intervals." The term "urea resin" refers to the reaction product of urea with formaldehyde (Rouse, cited supra, page 825; Gordon et al., Surface Coatings and Finishes, Chemical Publishing Co., Inc., New York, 1954, pages 116–117).

Moreover, experiments have shown that the object of the invention, namely to render the vessel both impervious and pliant, is attained particularly when chlorinated diphenyl is added to the lacquers.

Within the scope of the invention it is, however, also possible to omit both the nitrocellulose and also the esters of α-β-unsaturated carboxylic acids and to cause the lacquer, merely composed of an epoxy resin in combination with a urea resin, to react with reactive amine groups of polyamides and to build up with an addition of chlorinated diphenyl.

The following examples are given for the composition of the lacquers:

EXAMPLE I

| | Parts |
|---|---|
| Nitrocellulose | 2.0 |
| Polymerization product of esters of α-β-unsaturated carboxylic acids | 5.0 |
| Alkyd resin | 5.0 |
| Chlorinated diphenyl | 4.4 |
| Isocyanate | 4.0 |
| Acetates, a smaller part being benzene, as solvent | 79.6 |
| | 100.0 |

EXAMPLE II

| | Parts |
|---|---|
| Nitrocellulose | 2.0 |
| Polymerization product of esters of α-β-unsaturated carboxylic acids | 5.0 |
| Alkyd resin | 5.0 |
| Chlorinated diphenyl | 4.4 |
| Polyamide | 4.0 |
| Acetates, toluene, benzene, as solvent | 79.6 |
| | 100.0 |

EXAMPLE III

| | Parts |
|---|---|
| Polymerization product of esters of α-β-unsaturated carboxylic acids | 0.4 |
| Alkyd resin | 1.5 |
| Epoxy resin | 8.0 |
| Urea resin | 0.4 |
| Chlorinated diphenyl | 10.0 |
| Polyamide | 10.0 |
| Alcohols, xylene, butanol, toluene, as solvent | 69.7 |
| | 100.0 |

EXAMPLE IV

| | Parts |
|---|---|
| Polymerization product of esters of α-β-unsaturated carboxylic acids | 0.4 |
| Urea resin | 0.4 |
| Epoxy resin | 9.5 |
| Chlorinated diphenyl | 10.0 |
| Polyamide | 10.0 |
| Alcohols, xylene, butanol, toluene, as solvent | 69.7 |
| | 100.0 |

EXAMPLE V

| | Parts |
|---|---|
| Epoxy resin | 9.5 |
| Urea resin | 0.5 |
| Chlorinated diphenyl | 10.0 |
| Polyamide | 10.0 |
| Alcohols, xylene, butanol, toluene, as solvent | 70.0 |
| | 100.0 |

EXAMPLE VI

| | Parts |
|---|---|
| Nitrocellulose | 2.0 |
| Alkyd resin modified with esters of α–β-unsaturated carboxylic | 10.0 |
| Chlorinated diphenyl | 4.4 |
| Isocyanate | 4.0 |
| Acetates, a smaller part being benzene, as solvent | 79.6 |
| | 100.0 |

EXAMPLE VII

| | Parts |
|---|---|
| Alkyd resin modified with a polymerization product of ester of α-β-unsaturated carboxylic acids | 12.0 |
| Chlorinated diphenyl | 2.2 |
| Isocyanate | 4.0 |
| As solvent, chiefly acetates, a smaller part being benzene | 81.8 |
| | 100.0 |

In addition, the vessel according to the invention is provided internally and/or externally with a very thin coat or layer of metal, semi-metal compound or metal oxide, this being effected by first applying a coat of lacquer, then a coat of metal and, if desired, another coat of transparent lacquer. The coats of lacquer are also applied on the inner and/or outer surface of the vessel.

The metal coat may consist of various kinds of metal and semi-metal compounds, such as magnesium fluoride or silicon dioxide or of elementary metals or semi-metals. They can be applied by evaporation, spraying, cathode atomization in a high vacuum, or the like. In some instances, such as, for example, in the case of silicon dioxide, the lacquer priming is not absolutely necessary. In the case of the aforementioned metal coats or layers, however, it is essential. The transparent top coat of lacquer is desirable in all cases. The oxide coats cause a dulling of the surface which can be entirely eliminated by the outer covering coat of lacquer.

Finally, the metal coat may, according to the invention, be applied by rubbing onto the plastic surface metal powder which is worked absolutely or almost to a state of colloidal fineness. In this instance the metal is rubbed directly into the plastic material surface without first applying a prime coat of lacquer. On the other hand, it is necessary to provide the metal coat prepared in this manner with a transparent lacquer coat so as to fix it on the plastic surface.

According to the invention, vessels and particularly bottles made of the above-mentioned pliant synthetic materials are obtained which are of such close texture and so aroma-proof and at the same time so pliable that they can be used for perfumes, cosmetics, pharmaceuticals and the like, and, if desired, as spraying bottles. An absolutely hermetic, smooth surface is obtained. The prime coat of lacquer imparts a firm hold to the metal coat which cannot peel off or crack. The covering of the metal coat applied on the prime coat of lacquer with a top coat of similar lacquer serves for fixing the metal coat and is generally necessary, for example, in the case of polyethylene, whereas in the case of polyvinyl chloride or polyvinylidene chloride it is only necessary when the metal coat is required to possess a higer degree of frictional resistance.

Furthermore, the invention is of importance in the following respect: It is a known fact that polyethylene and other synthetic materials are very sensitive to the action of ultra-violet rays. In the case of vessels made from these substances, the contents may possibly be detrimentally affected by the action of ultra-violet rays. If, for example, the wall of a vessel made from polyethylene has become damaged by exposure to ultra-violet rays, the carbon becomes free, which has a damaging effect on the contents of the vessel. By the provision of a tightly adhering metal coat, a screen against the action of ultra-violet rays is produced. The lacquer, however, makes it possible to fix the metal coat and thereby form a protection against radiation.

The invention not only enables vessels of pliable synthetic material to be made with hermetic texture, resistance against aromas, acids, alkalis and the like, but it is also possible, according to the invention, to provide with metal and/or lacquer coats all kinds of plastic surfaces which have a wax-like feel and normally prevent a sufficient adhesion of lacquers thereto.

We claim:

1. A synthetic resin article having a surface characterized by enhanced resistance to permeation by organic fluids, said surface having an adherent coating of a cured epoxy resin.

2. A polyethyelne container having a surface characterized by enhanced resistance to permeation by organic fluids, said surface having an adherent coating of a cured epoxy resin.

3. A plastic vessel made of a pliable synthetic resin material which normally has a wax-like feel having a surface characterized by enhanced resistance to permeation by organic fluids,
said surface having an adherent continuous coating of a lacquer adhering to said plastic vessel during flexing thereof without peeling and cracking, and comprising:
an epoxy resin,
and a thin metallic coating covering said lacquer coating.

4. The plastic vessel of claim 3, further comprising another coating of said lacquer applied over said thin metallic coating.

5. A plastic vessel made of a pliable synthetic resin material which normally has a wax-like feel having a surafce characterized by enhanced resistance to permeation by organic fluids,
said surface having an adherent continuous coating of a lacquer adhering to said plastic vessel during flexing thereof without peeling and cracking, and comprising an epoxy resin, and a thin coating of magnesium fluoride covering said lacquer coating.

6. A plastic vessel made of a pliable synthetic resin material which normally has a wax-like feel having a surface characterized by enhanced resistance to permeation by organic fluids,
said surface having a first coating of silicon dioxide,
said first coating being covered with a layer of lacquer adhering to said plastic vessel during flexing thereof without peeling and cracking, and comprising an epoxy resin.

7. A plastic vessel made of a pliable synthetic resin material which normally has a wax-like feel having a surface characterized by enhanced resistance to permeation by organic fluids,
said surface having a first coating of a substantially colloidal metal powder,
said first coating being covered with a layer of lacquer adhering to said plastic vessel during flexing thereof without peeling and cracking, and comprising an epoxy resin.

8. The vessel according to claim 3, wherein said pliable synthetic resin material is polyethylene.

9. The vessel according to claim 3, wherein said pliable synthetic resin material is polyvinyl chloride.

10. The vessel according to claim 3, wherein said pliable synthetic resin material is polyvinylidene chloride.

References Cited

UNITED STATES PATENTS

| | | | |
|---|---|---|---|
| 2,125,341 | 8/1938 | Hall et al. | 117—71 |
| 2,277,083 | 3/1942 | Dorough. | |
| 2,668,134 | 2/1954 | Horton | 117—47 |
| 2,689,802 | 9/1954 | Korver | 117—71 |
| 2,698,241 | 12/1954 | Saner | 117—72 X |
| 2,698,242 | 12/1954 | Saner | 117—72 |
| 2,699,402 | 1/1955 | Meyer | 117—71 |
| 2,786,778 | 3/1957 | Palmquist | 117—71 |
| 2,830,721 | 4/1958 | Pinsky et al. | 117—161 |
| 2,836,318 | 5/1958 | Pinsky et al. | 117—138.8 |
| 2,836,319 | 5/1958 | Pinsky et al. | 117—138.8 |
| 2,860,801 | 11/1958 | Nielsen | 117—138.8 |
| 2,879,177 | 3/1959 | Nelson | 177—47 X |
| 2,892,733 | 6/1959 | Gardner et al. | 117—47 X |

OTHER REFERENCES

Bayer: "Polyurethanes" Modern Plastics, June 1947 (pages 151 and 152).

MURRAY KATZ, *Primary Examiner.*

JOSEPH B. SPENCER, RICHARD D. NEVIUS, WILLIAM D. MARTIN, R. S. CORNELL, *Examiners.*